(12) United States Patent
Jochman (10) Patent No.: US 10,766,090 B2
(45) Date of Patent: Sep. 8, 2020

(54) CONTROL PANELS FOR POWER SYSTEMS (71) Applicant: Illinois Tool Works, Glenview, IL (US)

(72) Inventor: Nathan Joe Jochman, Menasha, WI (US)

(73) Assignee: Illinois Tool Works, Glenview, IL (US)

( * ) Notice: Subject to any disclaimer, the term of this patent is extended or adjusted under 35 U.S.C. 154(b) by 0 days.

(21) Appl. No.: 15/444,789

(22) Filed: Feb. 28, 2017

(65) Prior Publication Data
US 2017/0246700 A1    Aug. 31, 2017

Related U.S. Application Data

(60) Provisional application No. 62/301,098, filed on Feb. 29, 2016.

(51) Int. Cl.
*B23K 9/00* (2006.01)
*B23K 9/10* (2006.01)
(Continued)

(52) U.S. Cl.
CPC .......... *B23K 9/1075* (2013.01); *B23K 9/1006* (2013.01); *B23K 9/32* (2013.01);
(Continued)

(58) Field of Classification Search
CPC ...... B23K 9/1006; B23K 9/1075; B23K 9/32; B60P 3/14
See application file for complete search history.

(56) References Cited

U.S. PATENT DOCUMENTS 6,099,285 A * 8/2000 Kurihara ................. B29C 49/20
425/144
6,670,580 B2 * 12/2003 Brofft .................. B23K 9/1006
219/134
(Continued)

FOREIGN PATENT DOCUMENTS

| CN | 202240076 | 5/2012 |
|---|---|---|
| DE | 2942771 | 5/1981 |
| WO | 2013184109 | 12/2013 |

OTHER PUBLICATIONS

Increase Your Efficiency, Increase Your Productivity, Increase Your Profitability, With One System, http://vanair.com/images/new-product-brochures/air-n-arc/AirNArc.300_Literature.2.21.17.web.pdf, Feb. 21, 2017 (2 pages).

(Continued)

*Primary Examiner* — Hau V Phan
(74) *Attorney, Agent, or Firm* — McAndrews, Held & Malloy, Ltd.

(57) ABSTRACT

Control panels for welding systems are disclosed. An example power system for a vehicle includes a generator to generate electrical power and to be installed on the vehicle; a first case component configured to be attached to a surface of the vehicle; and a second case component configured to be attached to the first case component to form an enclosure, the second case component comprising: a user control device configured to receive a user input for controlling an output of the generator; and an electrical output configured to output at least a portion of the electrical power generated by the generator.

21 Claims, 7 Drawing Sheets

(51) Int. Cl.
*B23K 9/32* (2006.01)
*B60P 3/14* (2006.01)
*F02B 63/04* (2006.01)
*F02B 63/06* (2006.01)
*H02G 3/04* (2006.01)
*H02G 3/08* (2006.01)

(52) U.S. Cl.
CPC ............... *B60P 3/14* (2013.01); *F02B 63/04* (2013.01); *F02B 63/06* (2013.01); *H02G 3/0406* (2013.01); *H02G 3/083* (2013.01)

(56) References Cited

U.S. PATENT DOCUMENTS

| | | | | |
|---|---|---|---|---|
| 7,049,707 | B2 * | 5/2006 | Wurtele | B60H 1/00378 290/1 A |
| 7,870,915 | B2 * | 1/2011 | Beeson | B60P 3/14 180/53.1 |
| 8,256,544 | B2 * | 9/2012 | Tarasinski | A01B 59/00 180/53.5 |
| 8,261,717 | B2 * | 9/2012 | Peotter | B66C 23/42 123/2 |
| 8,356,958 | B2 * | 1/2013 | Braun | E01C 19/48 404/101 |
| 8,627,797 | B2 * | 1/2014 | Renner | B60P 3/14 123/179.4 |
| 8,785,817 | B2 | 7/2014 | Luck et al. | |
| 2002/0043409 | A1 * | 4/2002 | Parkert | B60K 25/04 180/53.4 |
| 2005/0133489 | A1 * | 6/2005 | Gitter | B23K 9/1006 219/133 |
| 2006/0027547 | A1 * | 2/2006 | Silvestro | B23K 9/323 219/133 |
| 2008/0122195 | A1 | 5/2008 | Beeson et al. | |
| 2009/0218327 | A1 | 9/2009 | Beeson | |
| 2012/0212883 | A1 | 8/2012 | Hargreaves et al. | |
| 2014/0097165 | A1 | 4/2014 | Leisner et al. | |

OTHER PUBLICATIONS

Int'l Search Report and Written Opinion for Appln. No. PCT/US2017/019870 dated Jun. 30, 2017 (19 pages).

* cited by examiner

CONTROL PANELS FOR POWER SYSTEMS

RELATED APPLICATIONS

This patent claims priority to U.S. Provisional Patent Application Ser. No. 62/301,098, filed Feb. 29, 2016, entitled "Control Panels for Power Systems." The entirety of U.S. Provisional Patent Application Ser. No. 62/301,098 is incorporated herein by reference.

BACKGROUND

The present disclosure relates generally to power systems and, more particularly, to control panels for power systems.

A wide range work vehicles have been developed and are presently in service. Present estimates are that hundreds of thousands of such vehicles are operative in the United States alone. Depending upon their intended use, work vehicles may include highly integrated systems for performing operations such as welding, cutting, assembly, and so forth. Moreover, vehicles have been developed for providing hydraulic and compressed air service to applications, such as for driving air tools, pneumatic lifts and other compressed air-driven devices, as well as hydraulic lifts, hydraulic tools, concrete and metal working tools, and so forth. Similarly, where electrical power is generated on a vehicle, this may be made available for powering electrical tools, lights, and a wide range of auxiliary devices.

Conventional power systems for work vehicles provide auxiliary service, particularly electrical power, compressed air service and hydraulic service. Conventional power systems may include a remote user interface such as a sheet metal-constructed box that contains power, weld, and control connections. In conventional control boxes, the front of the box contains the user controls and the back of the box has attachment points to mount the box to a panel on the work truck.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

One or more embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Conventional power systems have short wire leads with connectors or bulkhead connectors on the remote control box for an installer to make the electrical connections, including welding connections, auxiliary power connections, and battery charge connections. The remote control box also contains strain relief devices for the cabling if the cabling is continuous through the box wall. Conventional remote control boxes contain a rear portion which integrates the strain relief and cable entry, while the front portion of the conventional remote control boxes contain the engine and operational control switches and displays. The construction of conventional remote control panels can make installation of such remote control panels challenging to install on a vertical panel due to the weight and dimensions of the box.

Disclosed examples improves upon the conventional remote control panels for power systems by incorporating strain relief and electrical connections into a front portion of the remote panel housing or box. As a result, disclosed examples eliminate the separation of connections and wiring that spans from the strain relief to the terminations across different portions (e.g., halves) of the housing. Because the wiring enters and is fully integrated into only the front half of the housing, these connections are independent (e.g., disconnected from) the rear of the housing. The independence substantially reduces the difficulty of installation of the remote control panel compared to conventional remote control panels. For example, disclosed remote control panels enable a simple light weight rear portion of the housing to be attached to a vertical mounting location, and enables the front assembly including the completed wiring to be installed after the rear portion is mounted. Incorporating all of the electrical strain reliefs and wiring onto one portion of the box reduces unnecessary strain in the wiring harness and enables removal of the front portion for easy access to the wiring and/or internal components of the remote control panel.

Disclosed examples eliminate or reduce electrical connections made by an installer of the power system and/or remote control panel at or near the remote panel box, relative to conventional remote control panels. Disclosed examples use continuous wire leads from inside the remote control panel all the way to the power generation portion of the power system. The elimination or reduction of electrical connections by an installer simplifies and/or improves the reliability of the electrical connections (e.g., makes the connections less susceptible to corrosion, improper installation, and/or poor installation techniques).

Disclosed examples invention provide one or more protective features on the front user interface panel. Example protective features include raised structural components that prevent impacts against exposed control switches and/or displays on the front user interface panel.

Disclosed example remote control panels are constructed to enable easier separation of a front remote control panel component from a rear remote control panel component. During an example installation, the rear remote control panel portion is first mounted to the truck cabinet or other vertical surface. When the rear remote control panel portion is mounted, the front portion (e.g., the controls, the controller, the cabling, the cable strain relievers) is attachable to the rear portion. Mounting or attaching of the rear panel may require drilling holes in the cabinet or other vertical surface and installing through-type fasteners (which can be difficult if the object being mounted, such as a conventional remote control panel, is large, heavy, or obstructed with wires and/or leads). Because disclosed examples attach the cabling in the front portion, disclosed example remote control panels reduce or eliminate relative motion between attachment points of the cabling and the case and, as a result, reduces unnecessary strain on the lead, terminations, and/or electrical components.

Electrical connections and connectors are potential points of failure that can be hazardous. By reducing or eliminating electrical connections made at the remote control panel during installation, disclosed examples improve durability and/or reliability of the remote control panel and improves the quality of an installation.

In some examples, other communication techniques are used to further reduce the number of physical connections between the remote control panel and the power source. For example, the remote control panel may communicate with and/or control the power source using wireless communications such as WiFi, Bluetooth, 3GPP communications, Long Term Evolution (LTE), Zigbee, or any other communications methods. The example power source and/or remote control panel may additionally or alternative use weld cable communications to enable control of the power source over a weld cable from a remotely located wire feeder.

Disclosed example power systems for vehicles include a generator, a first case component, and a second case component. The generator generates electrical power and to be installed on the vehicle, the first case component is configured to be attached to a surface of the vehicle. The second case component is configured to be attached to the first case component to form an enclosure. The second case component includes a user control device configured to receive a user input for controlling an output of the generator and an electrical output configured to output at least a portion of the electrical power generated by the generator.

In some examples, the second case component includes electrical conversion circuitry configured to receive the electrical power from the generator and to provide converted electrical power to the electrical output. In some such examples, the electrical output includes an electrical outlet to output the electrical power. In some examples, the electrical output includes at least one of a 120V alternating current output, a 240V alternating current output, a 24V direct current output, or a 12V direct current output. In some examples, the user control device includes a selection switch to control an output voltage of the electrical output.

In some example power systems, the electrical output comprises a welding output connector. Some such examples further include a welding circuit configured to convert the electrical power from the generator to welding-type power, the welding output connector to output the welding-type power. In some such example power systems, the user control device includes a welding control input configured to control the welding circuit.

In some example power systems, the second case component is configured to hold a control circuit inside of the enclosure when the second case component is attached to the first case component. In some examples, the second case component is configured to be detachable from the first case component to enable access to the control circuit. In some examples, the first and second case components comprise sheet metal or rigid plastic.

Some example power systems further include one or more cables coupling the generator to the electrical output, the one or more cables extending through the second case component and not extending through the first case component, and integrated strain relievers physically coupling the one or more cables to the second case component to reduce physical strain on the one or more cables. In some such examples, the one or more cables comprise one or more of: an alternating current cable connected between a winding of the generator and at least one of a transformer or an alternating current outlet on the second case component; a direct current cable connected to a direct current outlet on the second case component; weld conductors connected to welding output connectors on the second case component; or a control cable comprising one or more conductors connected between a control unit in the second case component and at least one of the generator, a welding circuit, a compressor, or a hydraulic pump.

Disclosed example control panels for vehicle power systems include a first portion of an enclosure configured to be mounted to a vehicle and a second portion of the enclosure. The second portion of the enclosure includes a control interface, at least one of the control interface or a control circuit coupled to the control interface configured to be coupled to the vehicle power system via one or more cables, and the second portion of the enclosure configured to be attached to the first portion of the enclosure to complete the enclosure and to mount the control interface to the vehicle.

In some examples, the control interface includes an electrical outlet to output electrical power from the vehicle power system. In some such examples, the electrical outlet comprises at least one of a 120V alternating current output, a 240V alternating current output, a 24V direct current output, or a 12V direct current output. In some example control panels, the second portion of the enclosure includes cable strain relievers to reduce stress on the one or more cables.

In some examples, the control circuit is hard wired to the one or more cables. In some examples, the first portion of the enclosure and/or or the second portion of the enclosure include a protective protrusion to reduce impacts on the control interface. In some examples, the second portion of the enclosure is detachable from the first portion of the enclosure to reduce a weight of the control panel during installation of the first portion of the enclosure, and is attachable to the first portion of the enclosure to mount the control interface onto the vehicle. In some examples, the second portion of the enclosure is detachable from the first portion of the enclosure to enable access to at least one circuit contained within the enclosure.

Figure 1:
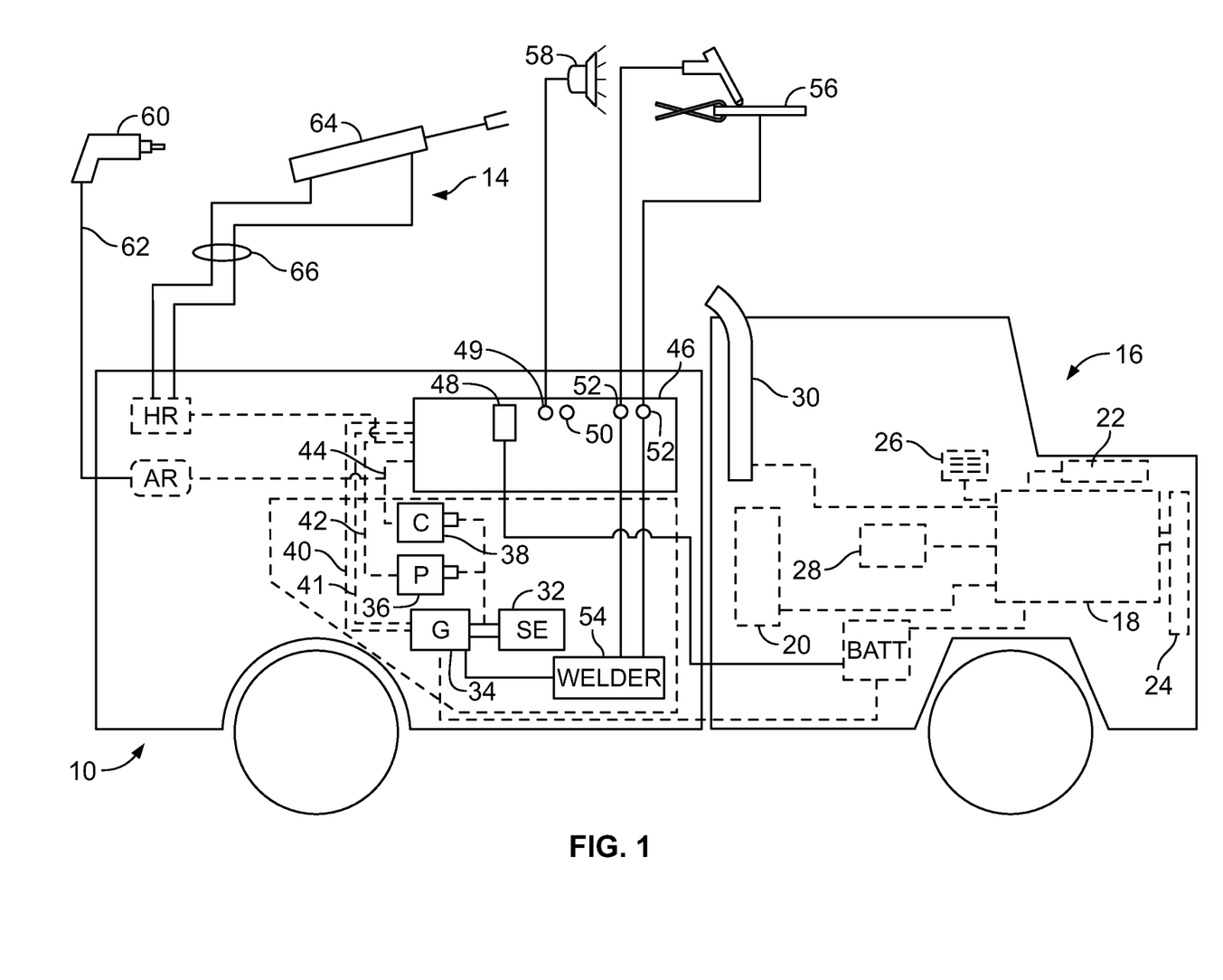
FIG. 1 is a diagrammatical overview of a work vehicle in which a service pack in accordance with aspects of this disclosure is installed.

Turning now to the drawings, and referring first to FIG. 1, a work vehicle is illustrated including equipment in accordance with the invention. The work vehicle, designated generally by reference numeral 10, is shown as a work truck, although any suitable configuration for the vehicle may be envisaged. In the illustrated embodiment, the vehicle includes a power system, designated generally by reference numeral 12 for supplying electrical, compressed air and hydraulic power to a range of applications, designated generally by reference numeral 14. The vehicle 10 has a main vehicle power plant 16 based around a vehicle engine 18. Although the invention is not limited to any particular configuration or equipment, work vehicle engines of this type will typically be diesel engines, although gasoline engines may be used in some vehicles.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system, designated diagrammatically at the symbol 26 will include an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The power system 12 may include one or more service systems driven by a service engine 32. In a present embodiment, the service pack provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain embodiments may use gasoline or other engines. The generator 34 may be directly driven by the engine, such as by close coupling the generator to the engine, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, such as a rotary screw compressor, a reciprocating compressor based upon one or more reciprocating pistons, and/or any other type of compressor.

The systems of the power system 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. The wiring and circuitry for the three systems may include protective circuits for the electrical power, including fuses, circuit breakers, and so forth, as well as valves for the hydraulic and air service. For the supply of electrical power, certain types of power may be conditioned (e.g., smoothed, filtered, etc.), and DC power output may be provided by rectification, filtering and regulating of AC output. Example DC power outputs include 12V DC and 24V DC, but any other fixed and/or user-adjustable DC power outputs may be provided. Valves for hydraulic power output may include by way example, pressure relief valves, check valves, shut-off valves, as well as directional control valves. The hydraulic pump may draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter.

As represented generally in FIG. 1, the generator 34 is also coupled to the vehicle electrical system, and particularly to the vehicle battery. Thus, the vehicle battery may serve as a shared battery with the power system 12, and is maintained in a good state of charge by the service pack generator output.

The cabling 40 and the conduits 41, 42, and 44 may, as illustrated in FIG. 1, route service for all of these systems directly from connections on the service pack. In a presently contemplated embodiment, for example, connections are provided at or near a base of an enclosure of the service pack, such that connections can be easily made without the need to open the enclosure. Moreover, certain control functions may be available from a remote control panel 46. The remote control panel 46, as noted above, may be located on any surface of the vehicle, or on multiple locations in the vehicle, and may be covered by doors or other protective structures, where desired. There is no requirement, generally, that the remote control panel 46 be located at the same location, or even near the locations of access to the electrical, hydraulic or compressed air output points of the service pack. In some examples, the panel is provided in a rear compartment covered by an access door. The remote control panel 46 may permit, for example, starting and stopping of the service engine 32 by a keyed ignition or starter button. Other controls for the engine may also be provided on the remote control panel 46. The remote control panel 46 may also provide operator interfaces for monitoring the service engine 32, such as fuel level gauges, pressure gages, as well as lights and/or indicators for parameters such as pressure, speed, and so forth. The service panel may also include a stop, disconnect or disable switch (not separately shown) that allows the operator to prevent starting of the service pack engine, such as during transport.

As noted above, the remote control panel 46 include access points for one or more of the systems of the service pack. In the illustrated embodiment, for example, the remote control panel 46 includes one or more alternating current electrical outputs, which may take the form of electrical receptacles 48 and 49 (for 12 volt DC power) and 50 (for AC power) are provided. The remote control panel 46 includes welding connections, such as positive and negative terminals to which a welding torch and a work cable may be connected to form a weld circuit.

In the embodiment illustrated in FIG. 1, the applications 14 may be coupled to the power system 12 by interfacing with appropriate outputs provided by the power system 12, either directly or via the remote control panel 46. For example, the power system 12 includes a welder 54 (e.g., weld circuitry configured to convert power from the generator 34 to welding-type power) that provides current-controlled and/or voltage-controlled power suitable for a welding application. As will be appreciated by those skilled in the art, the welder 54 receives power from the electrical output of the generator 34, and contains circuitry configured to provide for appropriate regulation of the output power provided to cables suitable for a welding application 56, which connect to the welder 54 via welding connectors 52 on the remote control panel 46. The presently contemplated embodiments include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack and powered by the service pack, where desired.

Similarly, DC loads may be coupled to the DC receptacle 49. Such loads may include lights 58, or any other loads that would otherwise be powered by operation of the main vehicle engine. The example DC receptacle 48 at the remote control panel 46 may be connected to the truck battery (or other portion of the truck electrical system) to provide battery charging and/or jump starting the truck 10. The example DC receptacle 48 may be connected to the battery via a path that is internal to the body of the truck 10 and/or via an external path (e.g., an extension cable connected to a jump start connector on the remote control panel 46). As mentioned above, the 12 volt DC output of the service pack also serves to maintain the vehicle battery charge, and to power any ancillary loads that the operator may need during work (e.g., cab lights, hydraulic system controls, etc.). Additionally or alternatively, the DC output may be used to provide DC power for loads other than those on the vehicle. For example, the DC output may be used to provide DC power for other vehicles (e.g., jump starting, battery charging, auxiliary vehicle loads) and/or non-vehicle devices (e.g., electronic devices, chargers, etc.).

The pneumatic and hydraulic applications may similarly be coupled to the service pack as illustrated diagrammatically in FIG. 1. For example, a hose 62 or other conduit may be routed from the compressed air source to a tool, such as an impact wrench 60. Many such pneumatic loads may be envisaged. Similarly, a hydraulic load, illustrated in the form of a reciprocating hydraulic cylinder 64 may be coupled to the hydraulic service by means of appropriate hoses or conduits 66. As noted above, and as will be appreciated by those skilled in the art, certain of these applications, particularly the hydraulic applications, may call for the use of additional valves, particularly for directional control and load holding. Such valves may be incorporated into the work vehicle and/or may be provided separately either in the application itself or intermediately between the service pack and the hydraulic actuators. One or more of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The power system 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. Depending upon the system components selected and the placement of the service pack, reservoirs may be provided for storing hydraulic fluid and pressurized air (denoted HR and AR, respectively in FIG. 1). The hydraulic reservoir may be placed at various locations or even integrated into the service pack enclosure. Likewise, depending upon the air compressor selected, no reservoir may be required for compressed air.

In use, the service pack provides power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. The invention thus allows for a service to be provided in several different manners and by several different systems without the need to operate the main vehicle engine at a service site.

Figure 2:
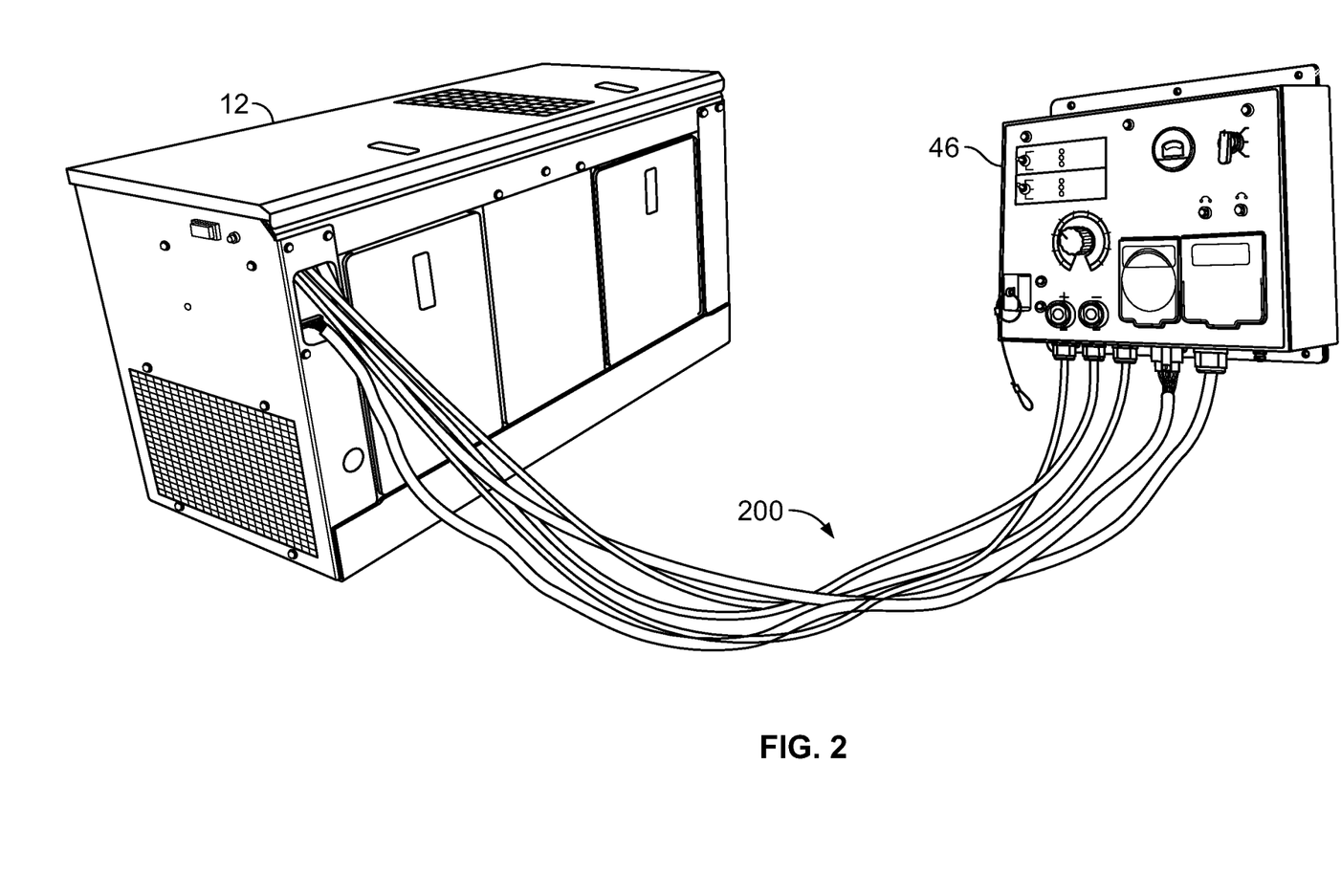
FIG. 2 illustrates an example cabling set up for the power system and the remote control device of FIG. 1 for controlling the power system in accordance with aspects of this disclosure.

FIG. 2 illustrates an example cabling set up for the power system 12 and the remote control panel 46 of FIG. 1 for controlling the power system 12. As shown in FIG. 2, the cables 200 includes multiple separate cables (e.g., the electrical cabling 40, 41 of FIG. 1) between the power system and the remote control panel 46. The cables 200 may include AC power cables, DC power cables, weld power cables, ground or reference cables, and/or control cables. In the example of FIG. 2, the cables are connected to both of the remote control panel 46 and the power system 12 prior to installation of the power system 12 and/or the remote control panel 46.

Figure 3:
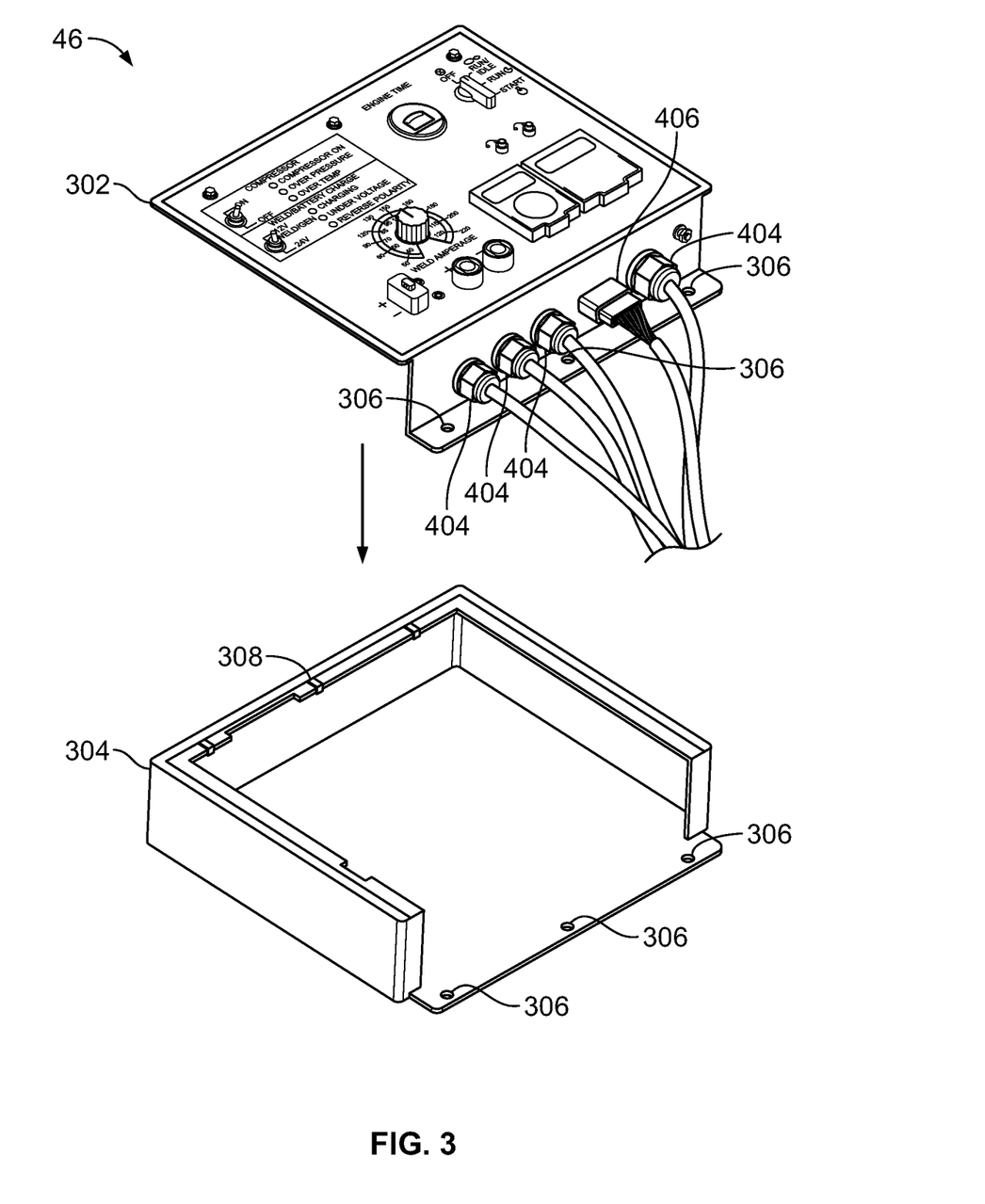
FIG. 3 illustrates a perspective view of the example front and rear portions of the example remote control device of FIGS. 1-4.

FIG. 3 illustrates a perspective view of example front and rear portions 302, 304 of the example remote control panel 46 of FIGS. 1 and 2. The front and rear portions 302, 304 are separate case components of the remote control panel 46, which functions as a case or enclosure for user interface circuitry, control circuitry, and/or any other types of circuitry. As used herein, the term "case component" refers to a portion of an enclosure which, when combined with one or more other portions, forms a complete enclosure to protect components inside the enclosure. Example case components are constructed with sheet metal and/or rigid plastic and include connection points to attach multiple case components together to form the enclosure.

As shown in FIG. 3, the front and rear portions 302, 304 include corresponding attachment points 306 that may be used to attach a front portion of the panel 46 to a rear portion of the panel 46 that is installed on the work truck or other installation location. For example, corresponding ones of the attachment points 306 may be secured using fasteners which, in cooperation with a fastener and/or support structure at a second joining location (e.g., a hook 308 on the second portion 304 of the panel 46 to support the first portion 302 of the panel 46 while the attachment points 306 are secured).

Figure 4:
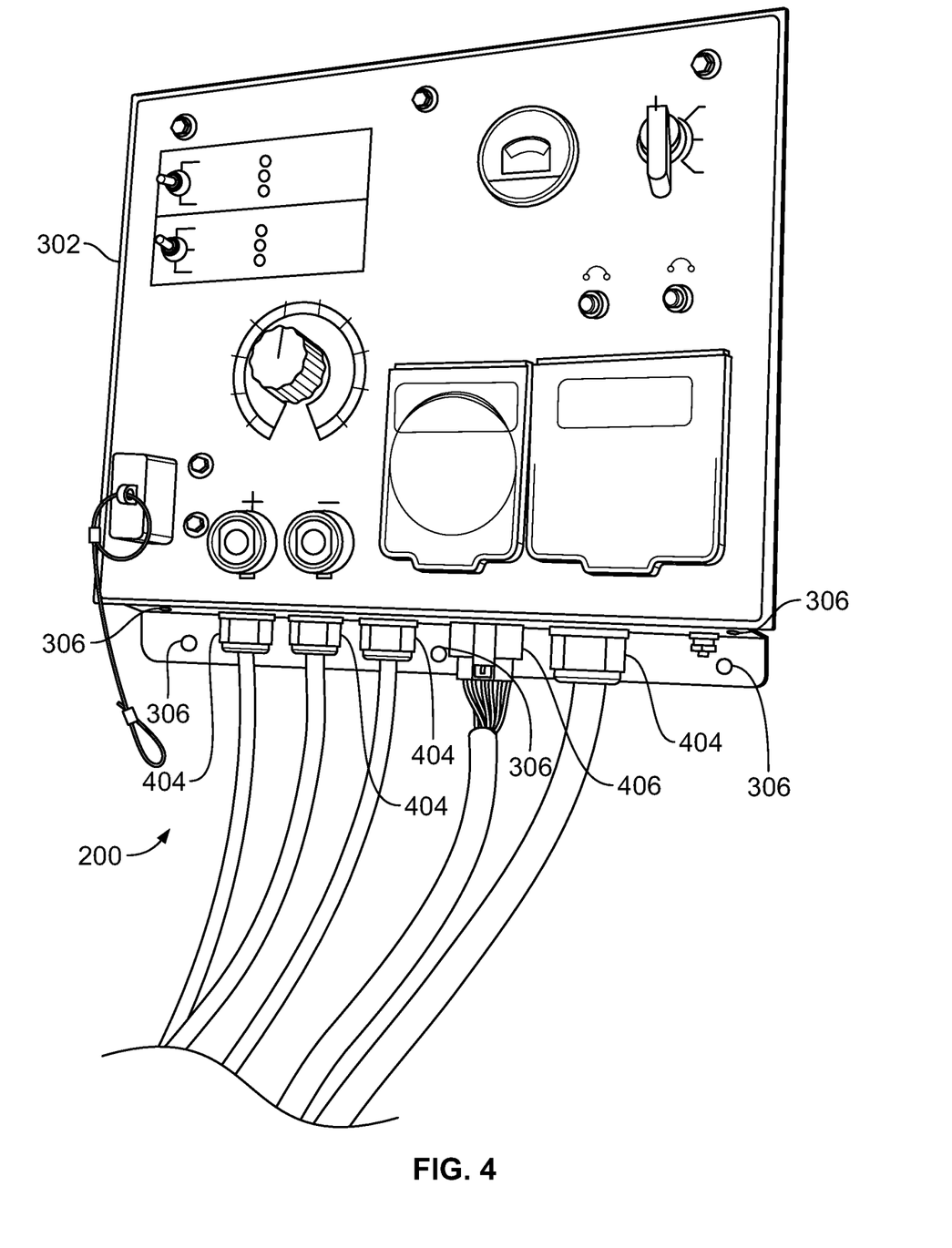
FIG. 4 illustrates an exterior perspective view of the example remote control device of FIGS. 1, 2, and/or 2, including cabling and integrated strain relief.

FIG. 4 illustrates an exterior perspective view of the example remote control panel 46 of FIGS. 1, 2, and/or 3, including cabling and integrated strain relief. User controls on the front of the remote control panel 46 are not illustrated in FIG. 4.

FIGS. 3 and 4 also illustrate example integrated strain relief devices 404 for power cables and an integrated strain relief device 406 for data cables. The integrated strain relief devices 404, 406 are integrated into the front portion of the reduce the number of connections to be made during installation of the panel 46. The cables 200 are attached only to the front portion of the panel 46 via the strain relief devices 404, 406 and are electrically connected only to components mounted to the front portion 302 of the panel 46.

Figure 5:
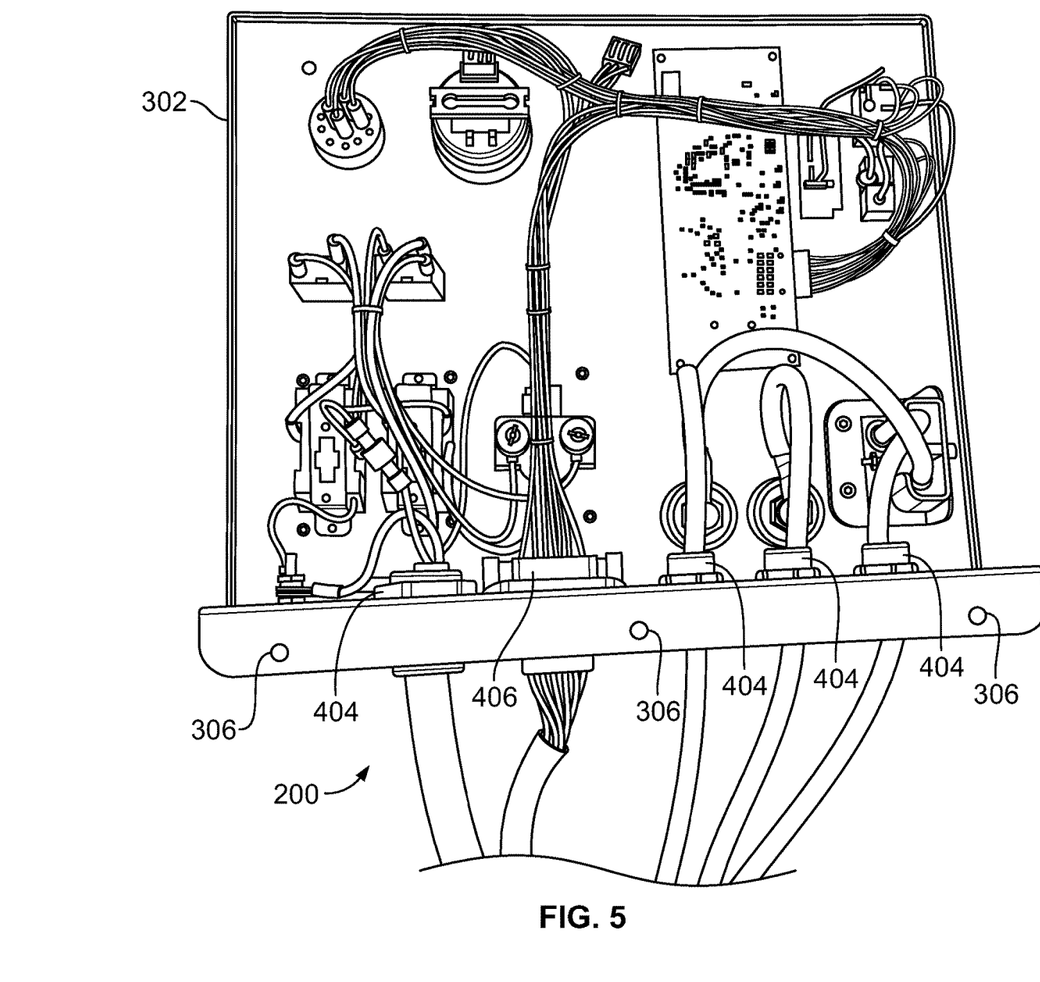
FIG. 5 illustrates an interior view of a front portion of the example remote control device of FIGS. 1-4, including features for use in mounting the front portion to a rear portion of the remote control device.

FIG. 5 illustrates an interior view of the front portion 302 of the example remote control panel 402 of FIGS. 1-4. As shown in FIG. 5, the wiring and/or cabling are connected to the strain relief devices 404, 406. Attaching all wiring and cabling to the front portion 302 of the remote control panel 46 (and not to the rear portion 304) enables attachment and/or removal of the front portion 302 from the rear portion 304 without having to disassemble the wiring.

Figure 6:
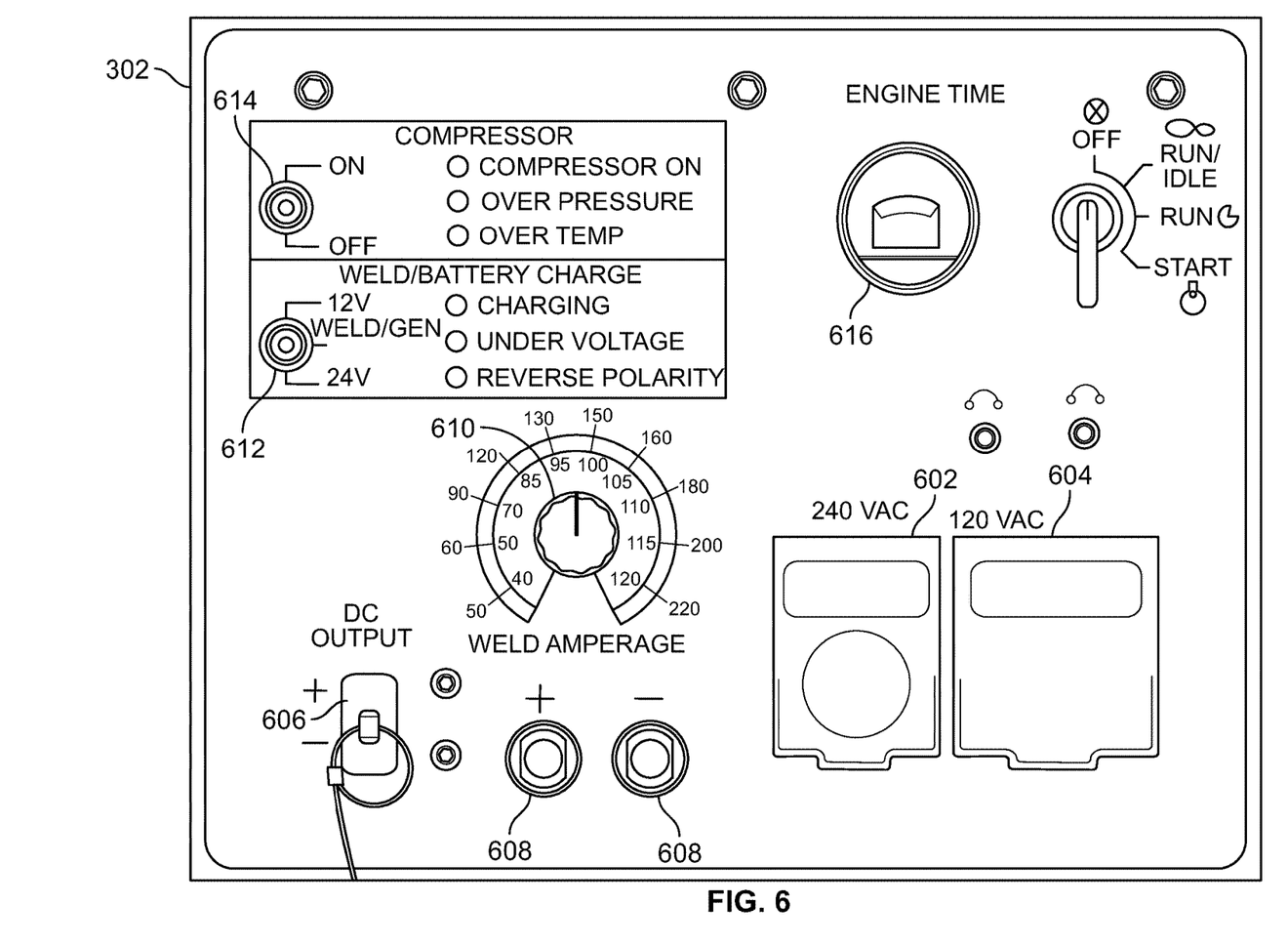
FIG. 6 illustrates a front view of the front portion of the example remote control device of FIGS. 1-5.

FIG. 6 illustrates a front view of the front portion 302 of the example remote control panel 46 of FIGS. 1-5. The example front portion 302 of the remote control panel 46 includes 120V AC and 240V AC outputs 602, 604 (e.g., the receptacles 50), a DC output 606 (e.g., the receptacle 49), weld output ports 608 (e.g., the welding connectors 52), and controls for controlling outputs of the power system 12. For example, the control panel 46 includes a weld amperage control 610, a weld and/or battery selector 612, an air compressor switch 614, and an engine time meter 616. The example engine time meter 616 is a digital display that may provide information in addition to engine time, such as power system fuel levels and/or maintenance information (e.g., maintenance alerts indicating that one or more components of the power system require repair or preventative maintenance). In some examples, there is an engine start switch and/or electrical fuse access.

Figure 7:
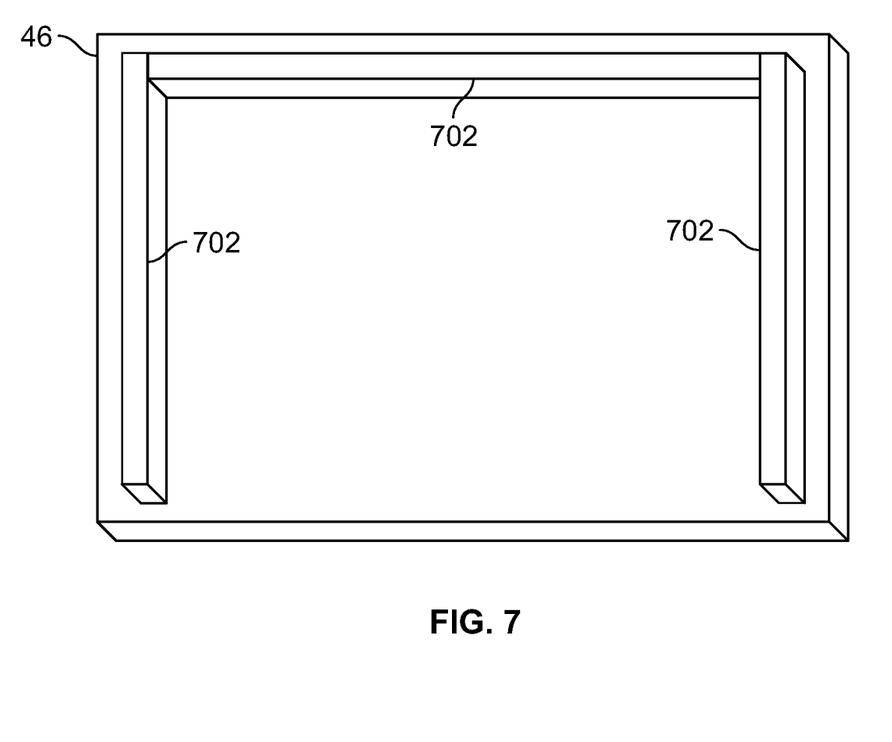
FIG. 7 illustrates an example of the remote control device of FIGS. 1-5 configured with a protective device.

FIG. 7 illustrates an example of the remote control panel 46 of FIGS. 1-5 configured with a protective device 702. The example protective guard 702 reduces the risk of foreign objects impacting the components of the front panel components, switches, and displays. The arrangement of the example protective guard 702 may be modified based on the location and/or type of the controls and/or displays.

While only certain features of the subject matter have been illustrated and described herein, many modifications and changes will occur to those skilled in the art.

What is claimed is:

1. A power system for a vehicle, comprising:
    a generator housed within a service pack to generate electrical power, wherein the service pack is to be installed on the vehicle at a first location on the vehicle;
    a remote control panel for the power system including a first case component and a second case component, the first case component configured to be attached to a surface of the vehicle at a second location on the vehicle that is separate and remote from the service pack, the second case component configured to be attached to the first case component, the first case component and the second case component together forming an enclosure;
    a user control device located on the second case component configured to receive a user input for controlling an output of the generator; and
    an electrical output located on the second case component configured to output at least a portion of the electrical power generated by the generator.

2. The power system as defined in claim 1, wherein the second case component comprises electrical conversion circuitry configured to receive the electrical power from the generator and to provide converted electrical power to the electrical output.

3. The power system as defined in claim 2, wherein the electrical output comprises an electrical outlet to output the electrical power.

4. The power system as defined in claim 3, wherein the electrical output comprises at least one of a 120V alternating current output, a 240V alternating current output, a 24V direct current output, or a 12V direct current output.

5. The power system as defined in claim 3, wherein the user control device comprises a selection switch to control an output voltage of the electrical output.

6. The power system as defined in claim 1, wherein the electrical output comprises a welding output connector.

7. The power system as defined in claim 6, further comprising a welding circuit configured to convert the electrical power from the generator to welding-type power, the welding output connector to output the welding-type power.

8. The power system as defined in claim 7, wherein the user control device comprises a welding control input configured to control the welding circuit.

9. The power system as defined in claim 1, wherein the second case component is configured to hold a control circuit inside of the enclosure when the second case component is attached to the first case component.

10. The power system as defined in claim 9, wherein the second case component is configured to be detachable from the first case component to enable access to the control circuit.

11. The power system as defined in claim 1, wherein the first and second case components comprise sheet metal or rigid plastic.

12. The power system as defined in claim 1, further comprising:
    one or more cables coupling the generator to the electrical output, the one or more cables entering the remote control panel and extending from the remote control panel through the second case component to the service pack and not extending through the first case component; and integrated strain relievers physically coupling the one or more cables to the second case component to reduce physical strain on the one or more cables.

13. The power system as defined in claim 12, wherein the one or more cables comprise one or more of:
- an alternating current cable connected between a winding of the generator and at least one of a transformer or an alternating current outlet on the second case component;
- a direct current cable connected to a direct current outlet on the second case component;
- weld conductors connected to welding output connectors on the second case component; or
- a control cable comprising one or more conductors connected between a control unit in the second case component and at least one of the generator, a welding circuit, a compressor, or a hydraulic pump.

14. A control panel for a vehicle power system, comprising:
- a first portion of an enclosure configured to be mounted to a vehicle at a location that is separate and remote from the vehicle power system; and
- a second portion of the enclosure comprising a control interface located on the second portion, at least one of the control interface or a control circuit coupled to the control interface configured to be coupled to the vehicle power system via one or more cables, and the second portion of the enclosure configured to be attached to the first portion of the enclosure to complete the enclosure and to mount the control interface to the vehicle, wherein the control interface comprises an electrical outlet to output electrical power from the vehicle power system, and whereby the enclosure forms a barrier between at least the control circuit and the vehicle power system.

15. The control panel as defined in claim 14, wherein the electrical outlet is a welding output configured to output welding-type power from the vehicle power system.

16. The control panel as defined in claim 14, wherein the electrical outlet comprises at least one of a 120V alternating current output, a 240V alternating current output, a 24V direct current output, or a 12V direct current output.

17. The control panel as defined in claim 14, wherein the second portion of the enclosure comprises cable strain relievers to reduce stress on the one or more cables.

18. The control panel as defined in claim 14, wherein the control circuit is configured to be hard wired to the one or more cables.

19. The control panel as defined in claim 14, wherein at least one of the first portion of the enclosure or the second portion of the enclosure comprises a protective protrusion to reduce impacts on the control interface.

20. The control panel as defined in claim 14, wherein the second portion of the enclosure is detachable from the first portion of the enclosure to reduce a weight of the control panel during installation of the first portion of the enclosure, and is attachable to the first portion of the enclosure to mount the control interface onto the vehicle.

21. The control panel as defined in claim 14, wherein the second portion of the enclosure is configured to be detachable from the first portion of the enclosure to enable access to at least one circuit contained within the enclosure.

* * * * *